Patented Oct. 26, 1948

2,452,390

UNITED STATES PATENT OFFICE 2,452,390

PREPARATION OF HYDROLYZABLE TITANIUM SOLUTIONS

Carl Marcus Olson, Oak Ridge, Tenn., assignor to E. I. du Pont de Nemours & Company, Wilmington, Del., a corporation of Delaware No Drawing. Application June 1, 1944, Serial No. 538,339

12 Claims. (Cl. 23—202)

This invention relates to novel methods for preparing titanium salt solutions for hydrolysis and to the production of improved hydrolysis precipitates therefrom. More particularly, it relates to the preparation in increased yields of hydrous titanium-oxygen compounds by hydrolytic precipitation from acid solutions of titanium in order to obtain, as a final product, an improved type of anatase or rutile pigment.

This application is a continuation-in-part of my copending application Serial No. 355,601, filed September 6, 1940, now abandoned.

As is known, titanium oxide pigments useful commercially in coating compositions, such as paints, enamels, etc., may be produced by calcining the precipitate resulting from the hydrolysis of a titanium salt solution, such as a sulfate, chloride, nitrate, etc. Thus, a titanium sulfate solution may be prepared by dissolving ilmenite or other titaniferous ores by sulfuric acid attack. The resulting crude sulfate solution is clarified and a portion of the iron is removed as crystalline copperas by reduction followed by concentration and cooling. The final solution may contain up to or in excess of 250 grams of $TiO_2$ per liter as a dissolved basic sulfate, about 50 g. of iron, from about 175 to 260 g. of free sulfuric acid, and varying smaller quantities of other metals. These titanium liquors, which are very dark in appearance, after prolonged boiling following nucleation (provided certain acid concentrations are maintained), precipitate a very white, hydrated titanium oxide. After careful washing to remove dissolved metals, and suitable calcination and processing in accordance with well-known procedures, a fully-developed $TiO_2$ pigment results as a final product.

When relatively high acid and titanium concentrations prevail in the solution subjected to hydrolysis, relatively low yields (below 90%) of $TiO_2$ result. Relatively dilute solutions, on the other hand, increase the yield to some extent, but their use incurs an undesired sacrifice in product whiteness and filterability. In early $TiO_2$ manufacture, yields of from about 70 to 90% had to be tolerated to obtain a product of passable color. To increase the yield to about 95% or above and facilitate precipitation of titanium from fairly strong or concentrated solutions and at the same time procure a product of good whiteness, it has been proposed to variously treat the titanium salt solution prior to hydrolysis. An outstandingly useful improvement process of this type contemplates intermingling or mixing the titanium liquor while at elevated temperatures, with a relatively minor quantity of water and subsequently raising the temperature of the mixture to boiling to induce $TiO_2$ precipitation. Admixture of the warm solution with the water produces a colloidal hydrous titanium oxide compound which acts as a beneficial nucleating or seeding agent in the hydrolysis. Another useful process involves the addition of a suspension of relatively fine, practically colloidal, hydrous titanium oxide to the hydrolysis solution as a nucleating material, said material having been previously prepared by neutralizing a portion of the hydrolyzable titanium liquor to a particular pH value.

Other less advantageous proposals exist, the purported object of which is to increase precipitate yields from seeded liquors. In one such process, water is added to the titanium solution while the latter is undergoing hydrolysis, the addition being effected either continuously or in equal increments throughout the hydrolysis, or after the major portion of the titanium has been precipitated. Another proposes to add to the titanium liquor a large amount of a dilute solution of an organic acid, either alone or in admixture with phosphoric acid, and while elevated temperatures are maintained. These dilution methods are disadvantageous because the color and filterability characteristics of the final product become impaired to an adverse extent. Furthermore, water addition during hydrolysis necessitates interruption of the boiling or hydrolysis operation, the cooling of the solution prior to effecting water addition, and the reheating of the resulting mixture. Aside from the undesirable effect upon product quality, it is obvious that hydrolysis interruption and cooling render this type of process quite unattractive from an economical and commercial standpoint. In addition, the physical nature of the fine particles precipitated in such processes, especially methods involving organic acid treatment, tends to impede the flow of water through the filter cake causing whatever colored impurities which are present to become strongly adsorbed upon or held by the precipitate. As a consequence, it is imperative that thorough, repeated and prolonged washing operations be resorted to in such processes if a pigment of good whiteness is desired. Finally, due to its physical character, a considerable precipitate loss is incurred during washing and filtration because of the decided tendency of the precipitate to pass through usual filter media.

It has been found that the disadvantages encountered in such prior procedures may be effectively remedied, and it is, accordingly, among the objects of this invention to overcome these disadvantages and to provide novel methods for attaining such desired results. It is among the particular objects of this invention to provide a method for preparing titanium salt solutions for hydrolysis from which one may readily procure improved $TiO_2$ hydrolysates in increased, high yields, e. g., of approximately 98% or higher; to provide a process from which said high yields result while normal good whiteness and other essential pigment properties are retained and preserved to provide a hydrolyzable titanium solution which will afford production of a precipitate having both improved whiteness and filterability characteristics with relatively complete resistance towards loss during filtration and washing; to improve the filterability of $TiO_2$ precipitates, and especially rutile, by at least 50%; and to provide a process from which these increased yields of high quality precipitate can be obtained upon hydrolysis of relatively concentrated titanium salt solutions, especially titanium sulfate.

These and other objects are attainable in this invention which comprises, prior to hydrolysis and after desired nucleation and colloidal enrichment of a relatively concentrated titanium salt solution, admixing a diluent with said solution in sufficient quantity to render the same substantially dilute in character, and then hydrolyzing the resulting mixture.

More specifically, the invention comprises seeding a relatively concentrated acid solution of titanium, such as the sulfate, chloride, nitrate, containing not less than substantially 180 g. $TiO_2$ per liter, heating the resulting seeded solution to increase the colloidal content thereof, thereafter mixing with said solution, but without precipitating substantial amounts of a filterable precipitate, a quantity of a diluent sufficient to reduce the $TiO_2$ concentration of said solution to not in excess of substantially 160 grams per liter, and then hydrolyzing the resulting diluted mixture at an elevated temperature until substantially complete precipitation of titanium is effected.

In one preferred embodiment, the invention comprises preparing a concentrated, seeded titanium sulfate solution having a $TiO_2$ concentration ranging from substantially 190 to 225 grams per liter and a factor of acidity of from about 50 to 100, heating said solution for a relatively short period of time at temperatures ranging from substantially 80 to 100° C., in order to enrich the colloidal content of said solution, thereupon rapidly mixing a hot diluent with said solution to decrease the $TiO_2$ concentration thereof to below substantially 150 g. per liter or about 145 g. per liter, effecting said rapid admixture prior to formation of a filterable precipitate in said titanium sulfate solution, and then heating the resulting diluted system at temperatures ranging from substantially 100° C. to the boiling point thereof to precipitate from substantially 92 to 99% of the titanium present.

While the invention is generally applicable to all types of hydrolyzable titanium salt solutions, and particularly to those referred to, it will be illustratively described in connection with one preferred adaptation thereof, involving the treatment of a titanium sulfate solution. These hydrolyzable solutions may be conveniently prepared by initially attacking a titaniferous ore or titanium-containing material, such as ilmenite, with a mineral acid, particularly sulfuric acid. Suitable methods for preparing said sulfate solutions include those set forth in U. S. Patent 1,504,669 to Blumenfeld. The resulting mass or reaction product from such acid attack is dissolved in water or dilute sulfuric acid, and the solution thus obtained is subjected to the usual purification, clarification and concentration treatments to obtain a relatively concentrated solution containing not less than substantially 180 g. $TiO_2$ per liter and preferably from substantially 190 or 200 to 250 or 260 grams or higher; below substantially 50 g. per liter of ferrous iron and a free acid or F. A. factor ranging from substantially 50 to 100. Prior to hydrolysis, said solution is nucleated or seeded in a desirable manner and preferably in accordance with the methods set forth in U. S. Reissue Patent 18,854 to Blumenfeld or Reissue Patent 18,790 to Mecklenburg. For instance, the nuclei may be formed in the solution by gradually adding the relatively concentrated titanium sulfate solution to water while the latter is maintained at an elevated temperature; or the nuclei may be formed by adding a small volume of the liquor to a larger volume of water held at such elevated temperature, following which filtration is had to remove sulfate ions, and the resulting nuclei is incorporated in the solution. The resulting mixture or suspension is then heated, for a relatively short period of time but less than that which would result in any substantial formation of a filterable precipitate, whereby desirable enrichment is had of the colloidal $TiO_2$ content of said solution. The temperature employed in effecting such enrichment is below the substantial boiling point of the solution and preferably ranges from about 80 to 110° C. The time expended in heating to effect enrichment will depend upon the temperature, concentration, etc., of the liquor, but usually ranges from about 10 minutes to 1 hour. Whatever temperature or extent of heating is resorted to, heat treatment is interrupted immediately prior to the time at which the solution indicates it is susceptible of substantially immediate change to a cream-colored appearance which is a warning or indication that a white hydrolyzing titanium oxide, flocculating into particles of filterable dimension, is imminent. That is, it is critical and essential in the invention, in procuring optimum results, that the heating step to effect colloidal enrichment of the titanium solution shall be arrested upon an increase in solution turbidity being noted and upon change of the solution color, successively, from black to olive green or steel gray, and to suspend said heating immediately prior to the moment that definite indications appear that the solution is ready to change, by flocculation, from a state where substantially no precipitation is observable to a coagulated condition which will provide a substantially filterable suspension of hydrolysate in the sulfuric acid media. When this stage is reached and heating is interrupted, a suitable quantity of a diluent, such as pure water or a very dilute sulfuric acid solution containing trivalent titanium maintained, preferably, at an elevated temperature approximating substantially the temperature of the solution under treatment, is caused to be rapidly admixed with and dispersed throughout the colloidally enriched solution. The amount of diluent employed in effecting said diluent may range from substantially 5 to 25% by volume of the solution undergoing treatment and preferably comprises from about 10 to 20% thereof. While these amounts are suggested, it will be obvious that the amount employed will largely depend upon the character and $TiO_2$ concentration of the solution under treatment. In any event, the amount of diluent employed must be sufficient to reduce the $TiO_2$ concentration of the solution from 180 g. per liter or higher to not in excess of about 160 g. or to as low as substantially 120 grams. Preferably, however, the secondary dilution is so conducted that the solution which is finally subjected to actual hydrolysis has a $TiO_2$ concentration ranging from substantially 140 to 150 g. per liter. After suitable treatment, the resulting diluted system is hydrolyzed at temperatures from substantially 100° C. to the boiling point thereof, whereby precipitation in excess of substantially 95% and about 98 or 99% of the titanium present is procured. Preferably, said hydrolysis is conducted in accordance with the procedures described in said Reissue Patent 18,854 or 18,790. The resulting hydrolysate will be found to exhibit improved color or whiteness characteristics, as well as improved and desired filterability properties. The precipitate recovered from the hydrolysis is washed, calcined, ground, dried and finished in the usual manner, a final $TiO_2$ product being obtained possessing desired increased whiteness, tinting strength, hiding power, fine, uniform particle size, as well as other essential pigment properties.

To a more complete understanding of the invention, the following specific examples are given which are not to be considered as in limitation but merely in illustration of the invention:

Example I

A titanium sulfate solution was prepared by dissolving ilmenite by means of strong sulfuric acid and subsequently treating by known chemical methods giving a low iron, mud-free solution containing about 260 grams $TiO_2$ per liter and having a factor of acidity of 75. About 1% of seed based on $TiO_2$ content, prepared by neutralizing 100 ml. of the solution to pH 4 in accordance with the process of U. S. Reissue Patent 18,790, was added to ten liters of the above solution. On heating at 90° C. for 30 minutes no filterable titanium compounds were present. Upon noting a rapid increase in color change, enough water at 90° C. to reduce the dissolved $TiO_2$ concentration to 145 grams per liter was added and the temperature raised to boiling. Immediately after the dilution was completed the precipitation of white hydrous titanium dioxide was apparent. After boiling for three hours the suspension was cooled somewhat and filtered. Filtration was readily accomplished with less solid material escaping with the filtrate than is observed in other methods of preparing $TiO_2$. After washing, calcining, wet grinding, drying and dry grinding, in accordance with regular practice the resulting pigment had superior color and tinting strength, and other properties fully equal to products of prior art processes. A yield of 98% of theoretical was obtained. The filtrate, diluted somewhat by the first portion of the wash water contained about 250 grams per liter of free $H_2SO_4$

Example II

The process described in Example I was repeated, but instead of diluting the seeded liquor to 145 grams $TiO_2$ per liter, dilution to 160 grams per liter was employed. As a result a normal yield of about 94 to 95% was obtained, but the product had excellent filterability and improved whiteness characteristics.

Example III

A complex nuclei suspension was prepared in accordance with U. S. Patent 2,342,483, by blending equal amounts of (a) A yield-inducing hydrolysis nuclei suspension, prepared by adding one volume of a titanium sulfate solution containing 150 grams per liter of $TiO_2$ to two volumes of water, adding sufficient caustic soda solution thereto to bring the pH value to 2.7 and provide a suspension containing 30 grams per liter of $TiO_2$, raising the temperature to 80° C. and maintaining at that temperature for 30 minutes, after which the seed was cooled, filtered and reslurried to 75 grams per liter of $TiO_2$, and (b) A rutile-inducing nuclei suspension, prepared by adding one volume of titanium tetrachloride solution containing 80 grams per liter of $TiO_2$ with stirring to one volume of water containing 128 grams of NaOH per liter, heating the resulting mixture to 85° C. for 30 minutes and then cooling and neutralizing to 7 pH by addition of dilute sodium hydroxide solution, washing the precipitate free of chlorides and then reslurrying in water to provide a suspension containing 75 grams per liter of $TiO_2$.

Ten volumes of this complex seed suspension, containing 75 grams of $TiO_2$ per liter, were added to 125 volumes of a titanium sulfate solution containing 200 grams per liter of $TiO_2$, 60 grams per liter of iron, and 500 grams per liter of sulfuric acid at a temperature of 80° C. The temperature of the seeded solution, after incorporation of the seed by stirring, was raised at the rate of ⅓ of a degree per minute. When a temperature of about 100° C.–102° C. and the graying point (where the color turns from a clear black to gray) was reached, the heating was interrupted and 50 volumes of water were added after which the heating was continued with stirring. The solution was then boiled for three hours. A 96% yield of a $TiO_2$ readily filterable hydrolysate, adapted to convert to rutile on calcination below 1000° C. was obtained. This precipitate, after separation from acid and impurities, was calcined in the presence of a small amount of alkali metal salt in accordance with U. S. Patent 1,892,693 at a temperature of 950° C. to give a completely converted rutile product of high strength, excellent color, hiding power and undertone.

The above procedure was repeated, except that the hydrolysis solution was not diluted with water as was done above at a temperature of 101° C. The hydrolysis product was compared for filtration properties as were the properties of the final pigment with that obtained employing the dilution procedure. The tests revealed that hydrolysis with dilution gave a more easily filtered product and that filtration capacity of the plant would be increased about 60%. The yield on hydrolysis without dilution was 94.2% for the three hours boiling time and only 95% conversion to rutile was obtained under the same calcination conditions. Although the tinting strength of the final pigment was about equal, its color was poorer than when dilution was practiced. The comparative results on color, tinting strength and filterability properties of these two types of hydrolysate and final pigment are more particularly shown in the following table (the color and tinting strength values having been determined in accordance with the methods referred to in U. S. Patent No. 2,213,542):

Table I

| Dilution | | | Control (without dilution) | | |
|---|---|---|---|---|---|
| Color | T. S. | Filterability | Color | T. S. | Filterability |
| 15:2Y | 192 | Per cent 160 | 13:3Y | 193 | Per cent 100 |

In adapting the invention, the seeded titanium sulfate or other salt solution may be prepared in accordance with any known or desired procedure. Likewise, the invention is usefully adaptable to the production of anatase or rutile pigments as well as to the production of various types of hydrolysates from whence such pigments are derived. It is particularly useful in hydrolysis methods designed to produce anatase forms of precipitate which will convert to rutile under the calcination temperatures normally used in anatase pigment manufacture, and whether such precipitates result by reason of a particular type of seeding agent or otherwise. The solutions used herein need not be especially pure in character, but may contain the usual impurities resulting from the attack of titanium ores with the corresponding acids. The methods of the aforesaid Mecklenburg and Blumenfeld patents are very satisfactory and therefore preferred. In practicing the Blumenfeld type of seeding, wherein the nucleation is accomplished by the interdiffusion or mixing of the titanium solution with a diluent, it has been found preferable to adjust the concentration of the original titanium solution so that after seeding is accomplished, the $TiO_2$ concentration is not less than about 190 to 200 g. per liter. While lesser concentrations may be used, they will be found less advantageous, especially because of the increased danger from the formation of a filterable precipitate during the enrichment period. Again, while said enrichment period may be as short as, say 10 minutes, it will be found preferable to resort to longer periods through employment of more concentrated solutions, thereby allowing ample time for the accomplishment of desired complete dilution before the appearance of any filterable precipitate. As already noted, the addition of water to the hot liquor after the appearance of a precipitate endangers the good whiteness of the product and an undesired cooling of the solution before adding water will be necessary in an attempt to safeguard color quality. By dilution prior to any substantial precipitation, however, interruption of the heating becomes entirely unnecessary.

As already noted, the secondary dilution may be accomplished with agents other than relatively pure water, such as dilute sulfuric acid, or with liquors derived from other sources such as the wash waters from titanium precipitate purification operations. Preferably, dilution of the seeded solution is effected with a hot diluent because its use is more advantageous and beneficial and in addition saves time in bringing about the desired precipitation. However, it is within the scope of the invention to employ a relatively cold or mildly heated diluent and continue heating thereof after addition to complete the desired precipitation. The exact manner in which the dilution occurs is not of considerable importance so long as it is rapid enough to be completely effected before undesired precipitation of the hydrolysate occurs. Either liquid may be mixed with the other or both may be simultaneously commingled, as in a Venturi mixer, and similar continuous mixing devices. Also, the degree of dilution may vary, as noted above, and in fact the degree of dilution may be deliberately controlled in order to achieve either an improvement in color and filterability with a normal yield of hydrolysate or an increased yield and improved filterability with normal color. Also, the proportion of free acid in the solution prior to hydrolysis may vary considerably although it is preferred to employ solutions having values for the factor of acidity which lie between substantially 50 and 100.

As will be evident, the instant invention constitutes a clear departure from and advancement over prior methods and by the feature of completing dilution before precipitation occurs, avoids the disadvantages of the post-precipitation dilution processes and enables the production of an improved type of precipitate as well as final pigment. Thus, an increase in yield of at least 2 to 4% or higher is readily effected while maintaining normally good color of product; further, as an accompaniment of such increase in yield, a decided improvement is had in both color and filterability of the precipitate. The improvement in filterability is most notable in my process, since it will be found to advantageously afford a ready increase of at least 50% in this respect alone, with filterability increases above 70% or 100% being not unusual. Again, the novel method of dilution of the present invention has an advantage over others resulting from the improved filterability which makes possible a sharp cut between the mother liquors and washings. This factor is particularly valuable in maintaining a reasonably high concentration of the mother liquor making it more adaptable for recovery or reuse than highly diluted solutions. Another advantage arising from improved filterability of the precipitate obtainable herein is the considerable time saving which is effected in the necessary filtering and washing operations. Further, a shorter heating or boiling time is required in the process to obtain said desired high yields, thereby effecting a considerable economy in $TiO_2$ pigment production.

The exact manner by which the unexpected results attainable in this invention arise is not completely known and therefore the invention should not be considered as limited to any particular theory. One explanation thereof may be given as follows:

During the hydrolysis of titanium solutions the free acid concentration gradually increases due to its liberation from titanium. This is shown by the following chemical equation illustrating the hydrolysis of titanyl sulfate:

$$TiOSO_4 + H_2O \rightarrow TiO_2 + H_2SO_4$$

This increasing acid concentration, in accordance with the well-known laws of chemical equilibrium, tends to prevent the complete precipitation of the titanium particularly in concentrated solutions. The efforts to obtain greater yields by diluting the solutions are, therefore, logical and well understood. However, it is well known that the addition of water to these systems during precipitation impairs the whiteness of the product as also does excessive dilution prior to precipitation. This appears to arise because the colored ions or hydrous oxides of such metals as Fe, Cr, V, etc., are less readily adsorbed by the titanium oxide under high acidic conditions. When water or weak solutions are added to the hydrolyzing system after precipitation has begun, it is practically impossible to avoid local zones of high dilution and any material precipitated therein is contaminated. Consequently, those who have practiced dilution during precipitation have found it necessary to stop the precipitation by cooling before adding water or to add other agents. Due to the time lag in starting and stopping the hydrolysis reaction, it is apparently not practical to completely prevent precipitation during dilution according to prior art methods, consequently no improvements in quality have been observed. In the instant invention, by completing the dilution before precipitation begins, these difficulties are effectively avoided. When the concentration of the titanium solution is sufficiently great, no precipitation even in the presence of seed will occur or prolonged boiling. At somewhat lesser concentrations a heating period varying, from several minutes to an hour or two, is necessary to cause precipitation. It is during this perioid, prior to precipitation, but subsequent to the seeding of the solution, that the dilution according to this invention is accomplished. Since the diluent is thoroughly mixed with the solution before precipitation begins no precipitate is formed under conditions of local high dilution and this accounts for the improved quality obtained, or the extraordinarily high yield obtained without lowering the color quality. This new method of dilution also tends to improve the filterability of the product. It is not known just why this occurs, but presumably the hydrolyzed titanium dioxide, which is of a flocculent nature, is formed in closer, more granular flocs which permits the easy passage of mother liquor and also avoids the loss of product by the escape of unassociated or dispersed primary particles through the filter medium.

The term "free acid," as used herein, is meant to refer to the excess of acid over and above that chemically combined with the basic constituents of the solution, such as titanium, iron and other metals. In calculating values for "free acid," 1 mol of acid is asumed to be combined with each mol of titanium. "Factor of acidity," also designated "F. A.," is the ratio of "free acid" to acid combined with titanium in the liquor multiplied by 100. Thus, $$F.A. = 100 \times \frac{Free\ acid}{Acid\ combined\ with\ titanium}$$

By the term "filterable precipitate" is meant a precipitate which may be removed from its mother liquor by ordinary filtration means, such as filter presses, conventional filters, laboratory filtration through paper, and the like. In the hydrolysis of titanium solutions, the formation of a filterable precipitate is marked by the development of a turbidity or milkiness in the solution. By the term "good filterability" is meant a satisfactory retention of the solids by the filter media and ready passage of the motor liquor in washings through the filter cake in an evenly distributed manner.

I claim as my invention:

1. A method for obtaining an improved hydrolysate from a concentrated, hydrolyzable titanium salt solution having not less than 180 g./l. $TiO_2$ and containing seed nuclei adapted to accelerate its hydrolysis, comprising heating said solution after it has been nucleated to increase its colloidal $TiO_2$ content, upon an increase in turbidity of said solution taking place as a result of said heating but prior to formation of a substantially filterable $TiO_2$ precipitate in the solution, interrupting said heat treatment and thereupon mixing a sufficient quantity of a diluent with the colloidally enriched solution to reduce its $TiO_2$ concentration to below 160 g./l., and then heating the resulting diluted titanium solution to effect its hydrolysis and precipitate said improved $TiO_2$ hydrolysate.

2. A method for obtaining an improved hydrolysate from a concentrated, hydrolyzable titanium sulfate solution having not less than 180 g./l. $TiO_2$ and previously seeded with nuclei to accelerate its subsequent hydrolysis, comprising after nucleation of said solution heating the same to increase its colloidal $TiO_2$ content, upon an increase in the turbidity of said solution taking place as a result of said heating but prior to formation in said solution of a substantially filterable $TiO_2$ precipitate, interrupting said heat treatment and thereupon mixing a sufficient quantity of a diluent with the resulting colloidally enriched solution to reduce its $TiO_2$ concentration to below 160 g./l., and then heating the diluted titanium solution thus obtained to effect its hydrolysis and precipitate said improved $TiO_2$ hydrolysate.

3. A method for obtaining an improved hydrolysate from a relatively concentrated titanium salt solution containing at least 180 g. $TiO_2$ per liter and which solution has been previously seeded with $TiO_2$ nuclei adapted to accelerate its subsequent hydrolysis, comprising after nucleation of said solution subjecting the same to heat treatment to build up its colloidal $TiO_2$ content, upon an increase in the turbidity of said solution taking place as a result of said heating and prior to formation in said solution of a substantially filterable $TiO_2$ precipitate, interrupting said heating operation and then incorporating a sufficient quantity of a diluent in the resulting colloidally enriched solution as will reduce its $TiO_2$ concentration to from substantially 120 to 160 g./l., and then heating the resulting diluted solution to effect its hydrolysis and precipitate said improved $TiO_2$ hydrolysate.

4. A method for obtaining an improved hydrolysate from a relatively concentrated titanium sulfate solution containing at least 180 g. $TiO_2$ per liter, which solution previously has been treated to provide seeding nuclei therein adapted to accelerate its subsequent hydrolysis, comprising following nucleation of said solution, subjecting the same to heat treatment to build up its colloidal $TiO_2$ content, upon an increase in the turbidity of said solution being noted from said heating and prior to formation of a substantially filterable $TiO_2$ precipitate therein, interrupting said heat treatment, and then incorporating a sufficient quantity of a hot diluent in the resulting colloidally enriched solution whereby its $TiO_2$ concentration is reduced to from substantially 120 to 160 g./l., and then heating the resulting diluted solution to hydrolyze the same and precipitate said improved TiO₂ hydrolysate.

5. A method for obtaining an improved hydrolysate from a relatively concentrated titanium chloride solution containing at least 180 g. TiO₂ per liter and previously seeded with TiO₂ nuclei adapted to accelerate its subsequent hydrolysis, comprising following nucleation of said solution subjecting the same to heat treatment to build up its colloidal TiO₂ content, upon an increase in the turbidity of said solution being noted as a result of said heating but prior to formation therein of a substantially filterable TiO₂ precipitate, interrupting said heating operation, thence incorporating a sufficient quantity of a diluent in the colloidally enriched solution to reduce its TiO₂ concentration to from substantially 120 to 160 g./l., and then heating the resulting diluted solution to hydrolyze the same and precipitate said improved TiO₂ hydrolysate.

6. A method for obtaining an improved hydrolysate from a relatively concentrated titanium nitrate solution containing at least 180 g. TiO₂ per liter and previously seeded with TiO₂ nuclei adapted to accelerate its subsequent hydrolysis, comprising following nucleation of said solution subjecting it to heat treatment to build up its colloidal TiO₂ content, upon an increase in the turbidity of said solution being noted as a result of said heating but prior to formation therein of a substantially filterable TiO₂ precipitate, interrupting said heating operation, then incorporating a sufficient quantity of a diluent in the colloidally enriched solution to reduce its TiO₂ concentration to from substantially 120 to 160 g./l., and then heating the resulting diluted solution to hydrolyze the same and precipitate said improved TiO₂ hydrolysate.

7. A method for treating a nucleated, hydrolyzable, relatively concentrated titanium salt solution containing at least 180 g. TiO₂ per liter to improve the character and yield of precipitate obtainable on hydrolysis, comprising prior to said hydrolysis and after nucleation of said solution through incorporation of seeding nuclei therein, heating the seeded solution at a temperature ranging from substantially 80 to 100° C. to effect colloidal enrichment thereof, interrupting said heat treatment upon a rapid change taking place in the turbidity of the solution being treated, and then prior to precipitation of a filterable precipitate taking place, incorporating a hot diluent in said solution in sufficient amount to reduce its TiO₂ concentration to from substantially 120 to 160 g. per liter, and then hydrolyzing at an elevated temperature the resulting dilute solution.

8. A method for treating a nucleated, hydrolyzable and relatively concentrated titanium sulfate solution containing at least 180 g. TiO₂ per liter to improve the character and yield of precipitate obtainable therefrom on hydrolysis comprising prior to said hydrolysis and after nucleation of said solution by incorporating seeding nuclei therein heating the seeded solution at a temperature ranging from substantially 80 to 100° C. to colloidally enrich the same, interrupting said heating operation upon a rapid change taking place in the turbidity of the solution under treatment, and then prior to occurrence of precipitation of a filterable precipitate therfrom incorporating hot water in said solution in sufficient amount to reduce its TiO₂ concentration to from substantially 120 to 160 g. per liter, and then hydrolyzing at an elevated temperature the resulting dilute solution.

9. A method for treating a nucleated, hydrolyzable and relatively concentrated titanium salt solution containing at least 180 g. TiO₂ per liter to improve the character and yield of hydrolysate obtainable therefrom, comprising, prior to hydrolysis of said solution and after nucleation thereof by gradually mixing said concentrated titanium salt solution with a hot diluent, heating the nuclei-containing solution at a temperature ranging from substantially 80–100° C. to colloidally enrich the same, arresting said heat treatment upon occurrence of a rapid change in solution color and turbidity, and then, prior to precipitation of a filterable precipitate therefrom, incorporating in said solution from substantially 5 to 25% by volume, based on the solution undergoing treatment, of a diluent to reduce the TiO₂ concentration of said solution to from substantially 120 to 160 g. per liter, and then hydrolyzing the resulting dilute solution.

10. A process for treating a nucleated, hydrolyzable and relatively concentrated titanium sulfate solution containing from substantially 190 to 225 g. TiO₂ per liter, and having a free acid factor ranging from about 50 to 100, to improve the character and yield of hydrolysate obtainable therefrom, comprising, subsequent to nucleation through gradual admixture of said concentrated titanium sulfate solution with a hot diluent, and prior to hydrolysis thereof, heating said nucleated solution for a short period of time at a temperature ranging from substantially 80–100° C. to effect colloidal enrichment thereof, interrupting said heating upon a rapid change in the color and turbidity of said solution taking place, thereupon but prior to precipitation of a filterable precipitate, incorporating a hot diluent in said solution in sufficient quantity to reduce its TiO₂ concentration thereof to from substantially 140 to 150 g. per liter, and then hydrolyzing at an elevated temperature the resulting dilute solution.

11. A method for treating a nucleated, hydrolyzable, relatively concentrated titanium sulfate solution containing from substantially 190 to 225 g. TiO₂ per liter, to improve the filterability characteristics of a precipitate obtainable therefrom on hydrolysis, comprising, prior to said hydrolysis and after nucleation of said solution, by gradually adding the latter to a hot diluent, heating the said solution to a temperature ranging from substantially 80–100° C. to effect its colloidal enrichment, interrupting said heating upon a rapid change occurring in the color and turbidity of the said solution taking place, thereupon, but prior to the occurrence of any substantial precipitation of a filterable TiO₂ precipitate from said solution, incorporating therein an amount of diluent therein ranging from substantially 5 to 25% by volume of the solution under treatment to reduce its TiO₂ content to below 160 g./l. and above 120 g./l., and then hydrolyzing the resulting dilute solution at an elevated temperature.

12. A method for treating a nucleated, hydrolyzable, relatively concentrated titanium sulfate solution containing from substantially 190 to 225 g. TiO₂ per liter to improve the filterability characteristics of a TiO₂ precipitate obtainable therefrom on hydrolysis, comprising, prior to hydrolysis and after nucleation of said solution, by gradually adding the latter to a hot diluent, heating the same at a temperature ranging from substantially 80–100° C. to effect its colloidal enrichment, interrupting said heating upon a rapid change occurring in the color and turbidity of the solution under treatment, thereupon, but prior to any substantial precipitation of a filterable $TiO_2$ precipitate from said solution, incorporating an amount of diluent therein ranging from substantially 10 to 20% by volume of the solution under treatment, whereby its $TiO_2$ concentration becomes reduced to from substantially 140 to 150 g. per liter, and then hydrolyzing the resulting dilute solution at an elevated temperature.

CARL MARCUS OLSON.

REFERENCES CITED

The following references are of record in the file of this patent:

UNITED STATES PATENTS

| Number | Name | Date |
|---|---|---|
| 1,851,487 | Blumenfeld | Mar. 29, 1932 |
| Re. 18,854 | Blumenfeld | May 30, 1933 |

OTHER REFERENCES

Gardner et al., "Physical and Chemical Examination of Paints, Varnishes, Lacquers, and Colors," 10th edition, pp. 35-36.